US011206513B1

(12) United States Patent
John et al.

(10) Patent No.: US 11,206,513 B1
(45) Date of Patent: Dec. 21, 2021

(54) VEHICLE DENSITY OVER THE AIR UPDATE SCHEDULING

(71) Applicant: FORD GLOBAL TECHNOLOGIES, LLC, Dearborn, MI (US)

(72) Inventors: Jerry John, Sunnyvale, CA (US); Yun Ho Lee, Pleasanton, CA (US); Tao Wu, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/061,123

(22) Filed: Oct. 1, 2020

(51) Int. Cl.
| | | |
|---|---|---|
| *H04W 4/06* | (2009.01) | |
| *H04W 4/50* | (2018.01) | |
| *H04W 4/44* | (2018.01) | |
| *H04W 24/10* | (2009.01) | |
| *H04W 84/04* | (2009.01) | |

(52) U.S. Cl.
CPC .............. *H04W 4/06* (2013.01); *H04W 4/44* (2018.02); *H04W 4/50* (2018.02); *H04W 24/10* (2013.01); *H04W 84/042* (2013.01)

(58) Field of Classification Search
CPC ......... H04W 4/06; H04W 4/50; H04W 24/10; H04W 4/44; H04W 84/042
See application file for complete search history.

(56) References Cited

U.S. PATENT DOCUMENTS

| | | | |
|---|---|---|---|
| 10,051,462 B2 | 8/2018 | Gupta et al. | |
| 10,567,471 B2 | 2/2020 | Patsiokas et al. | |
| 2007/0155368 A1 | 7/2007 | Phelan | |
| 2013/0094428 A1* | 4/2013 | Lee | H04L 51/38 370/312 |
| 2018/0349157 A1* | 12/2018 | Ahmed | G06F 8/65 |
| 2020/0022147 A1 | 1/2020 | Tran et al. | |

FOREIGN PATENT DOCUMENTS

WO    WO-2013182247 A1 * 12/2013 .......... H04W 72/005

* cited by examiner

*Primary Examiner* — Brandon J Miller
(74) *Attorney, Agent, or Firm* — Michael J. Spenner; Brooks Kushman P.C.

(57) ABSTRACT

A geographical area of a mobile network is directed to perform an OTA test content drop of a predefined time, data, size, and duration. Statistical data is identified with respect to vehicle density in the geographical area, the statistical data being computed from reception reports received from vehicles responsive to the OTA test content drop. Responsive to at least a predefined minimum target of vehicles being located in the geographical area, and based on the statistical data, one or more time slots for an OTA delivery in the geographic area suitable for broadcast delivery are determined. The OTA update is delivered over broadcast instead of unicast during the one or more time slots.

19 Claims, 6 Drawing Sheets

VEHICLE DENSITY OVER THE AIR UPDATE SCHEDULING

TECHNICAL FIELD

Aspects of the present disclosure generally relate to the determination of vehicle density in a specific area, as well as to the planning and scheduling of over-the-air (OTA) updates via broadcast or unicast transmission.

BACKGROUND

Vehicle-to-anything (V2V) communication allows vehicles to exchange information with other vehicles. Vehicle-to-infrastructure (V2I) communication enables applications to facilitate and speed up communication or transactions between vehicles and infrastructure.

Unicast data transmission refers to a one-to-one transmission from a first point in a network to another point. A unicast transmission is typically sent from an origin (or sender) to a destination (or recipient). Multicast or broadcast transmission refers to a one-to-many transmission from one point in the network to multiple destination points.

SUMMARY

In one or more illustrative examples, a system for performing over-the-air (OTA) update of vehicles via broadcast and/or unicast transmission is provided. The system includes an OTA manager device programmed to identify statistical data with respect to vehicle density in a geographical area of a mobile network, the statistical data being computed from reception reports received from vehicles responsive to an OTA test content drop of predefined time, data, size, and duration as performed by the mobile network; responsive to at least a predefined minimum target of vehicles being located in the geographical area, determine, based on the statistical data, one or more time slots for an OTA delivery in the geographic area suitable for broadcast delivery; and deliver the OTA update over broadcast instead of unicast during the one or more time slots.

In one or more illustrative examples, a method for performing over-the-air (OTA) update of vehicles via broadcast and/or unicast transmission is provided. A geographical area of a mobile network is directed to perform an OTA test content drop of a predefined time, data, size, and duration. Statistical data is identified with respect to vehicle density in the geographical area, the statistical data being computed from reception reports received from vehicles responsive to the OTA test content drop. Responsive to at least a predefined minimum target of vehicles being located in the geographical area, and based on the statistical data, one or more time slots for an OTA delivery in the geographic area suitable for broadcast delivery are determined. The OTA update is delivered over broadcast instead of unicast during the one or more time slots.

In one or more illustrative examples, a non-transitory computer-readable medium includes instructions for performing over-the-air (OTA) update of vehicles via broadcast and/or unicast transmission. When executed by a processor of an OTA manager device, the instructions cause the OTA manager device to direct a geographical area of a mobile network to perform OTA test content drop of predefined time, data, size, and duration; identify statistical data with respect to vehicle density in the geographical area, the statistical data being computed from reception reports received from vehicles responsive to the OTA test content drop; responsive to at least a predefined minimum target of vehicles being located in the geographical area, determine, based on the statistical data, one or more time slots for an OTA delivery in the geographic area suitable for broadcast delivery; and deliver the OTA update over broadcast instead of unicast during the one or more time slots.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

As vehicles move towards a fully network connected vehicle architecture, OTA software updates have become more useful for applying features and bug-fixes to vehicles. In some examples, vehicles are equipped with cellular modems and corporate-negotiated data connections to mobile network operators (MNO) to deliver OTA updates.

OTA updates generally use a unicast approach, with separate downloads to each vehicle via a push or pull method. Since the OTA content may be the same for certain vehicle models, this method can be inefficient, consuming cellular data and incurring additional cost. Instead of unicast, if there are a sufficient number of target vehicles within a geographical area, OTA updates can be broadcast instead, resulting in a better use of the contracted MNO spectrum. This would accordingly allow for more efficient OTA update delivery.

Aspects of the disclosure describe an approach to determining density of vehicles in specific areas (e.g., service areas) at specific time periods to determine if and when to use broadcast or unicast transmission. The described approach may then schedule the updates with support from the MNO.

Figure 1:
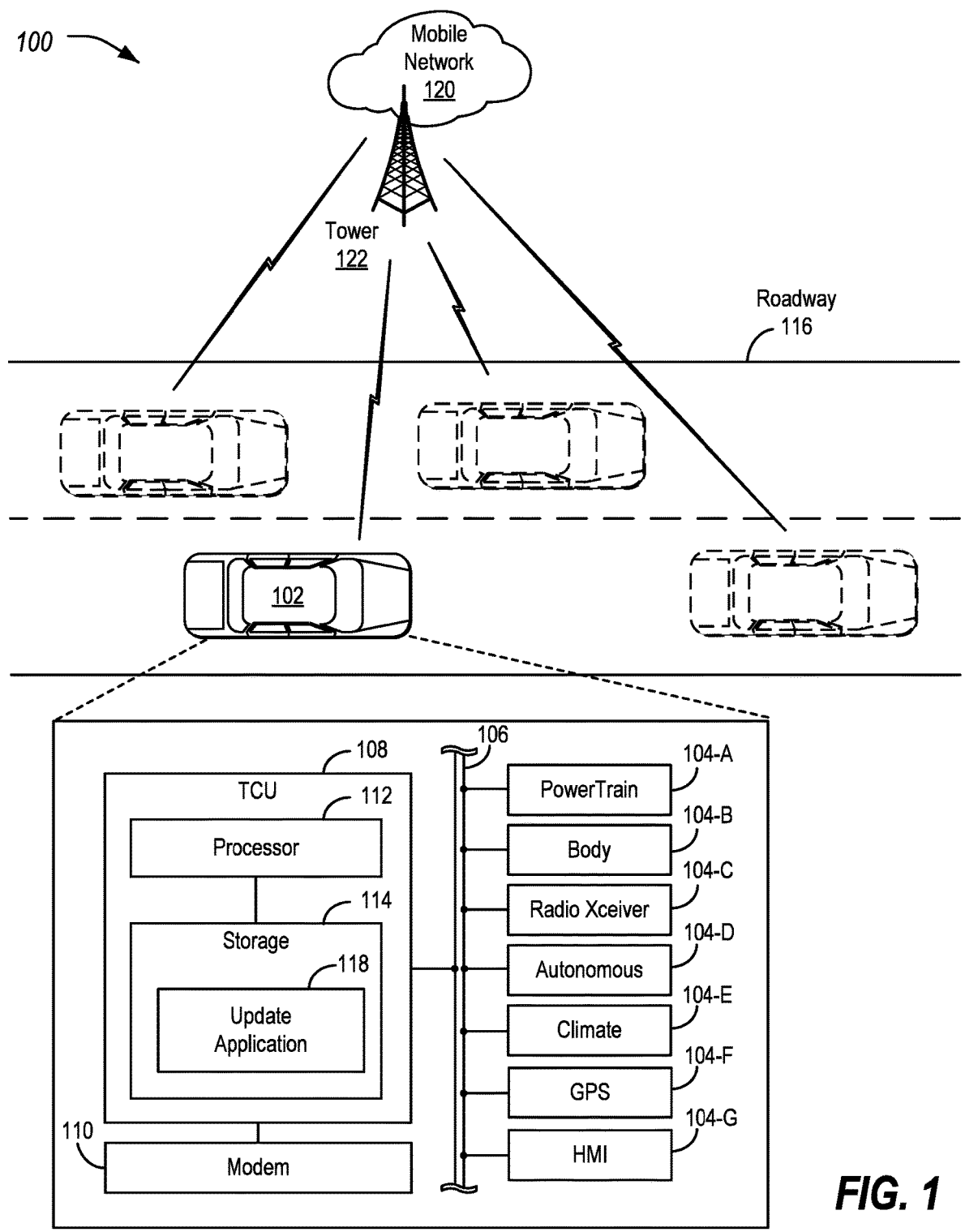
FIG. 1 illustrates an example system for the OTA update of vehicles via broadcast and/or unicast transmission.

FIG. 1 illustrates an example system 100 for the OTA update of vehicles 102 via broadcast and/or unicast transmission. The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle controllers 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle controllers 104 and with other devices of the system 100. For example, the TCU 108 may include or otherwise access a cellular modem 110 configured to facilitate communication with other vehicles 102 or with infrastructure. The TCU 108 may, accordingly, be configured to communicate over various protocols, such as with a communication network over a network protocol (such as Uu). The TCU 108 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 108 may include various types of computing apparatus in support of performance of the functions of the TCU 108 described herein. In an example, the TCU 108 may include one or more processors 112 configured to execute computer instructions, and a storage 114 medium on which the computer-executable instructions and/or data may be maintained. A computer-readable storage medium (also referred to as a processor-readable medium or storage 114) includes any non-transitory (e.g., tangible) medium that participates in providing data (e.g., instructions) that may be read by a computer (e.g., by the processor(s)). In general, the processor 112 receives instructions and/or data, e.g., from the storage 114, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, JavaScript, Perl, PL/SQL, etc.

The TCU 108 may be configured to include one or more interfaces from which vehicle information may be sent and received. In an example, the TCU 108 may be configured to facilitate the collection of connected vehicle data and/or other vehicle information from the vehicle controllers 104 connected to the one or more vehicle buses 106. While only a single vehicle bus 106 is illustrated, it should be noted that in many examples, multiple vehicle buses 106 are included, with a subset of the controllers 104 connected to each vehicle bus 106.

The TCU 108 may also be configured to execute an update application 118 to receive data over a network 120 and provide the received data to the vehicle controllers 104 via the one or more vehicle buses 106. For instance, the TCU 108 may wirelessly communicate with a cellular tower 122 to access the network 120. While only one tower 122 is shown, it should be noted that the network 120 typically includes many towers 122, each assigned to provide connectivity to a different geographic area (e.g., a cell).

Figure 2:
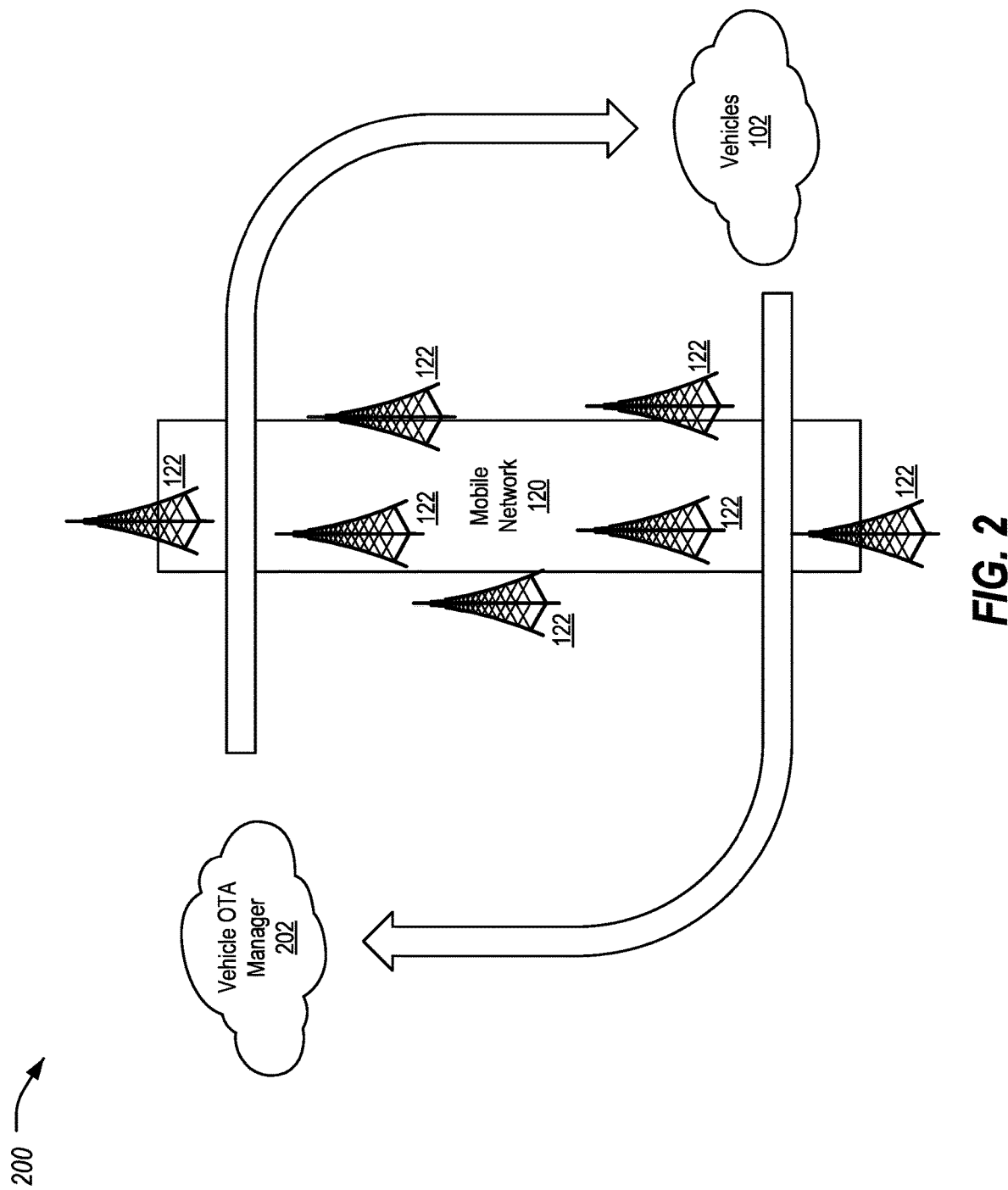
FIG. 2 illustrates an example of an OTA manager for software updates that is in communication with the mobile network.

FIG. 2 illustrates an example 200 of an OTA manager 202 for software updates that is in communication with the mobile network 120. As shown, the OTA manager 202 generally provides instruction to the mobile network 120, which in turn provides updates to the vehicles 102. The vehicles 102 receive the updates and provide status or other information to the OTA manager 202.

The OTA manager 202 may also utilize the services of the mobile network 120 to assist in determining the whether to use broadcast or unicast in a certain geographical area or service area. In an example, the service area may be a geographic area serviced by one of the towers 122, but areas spanning multiple towers 122 or subsets of tower 122 service areas may be used as well. In many examples, the OTA manager 202 may operate as the decisionmaker in terms of how to proceed with broadcast or unicast, e.g., based on considerations of OTA efficiency and cost.

Figure 3:
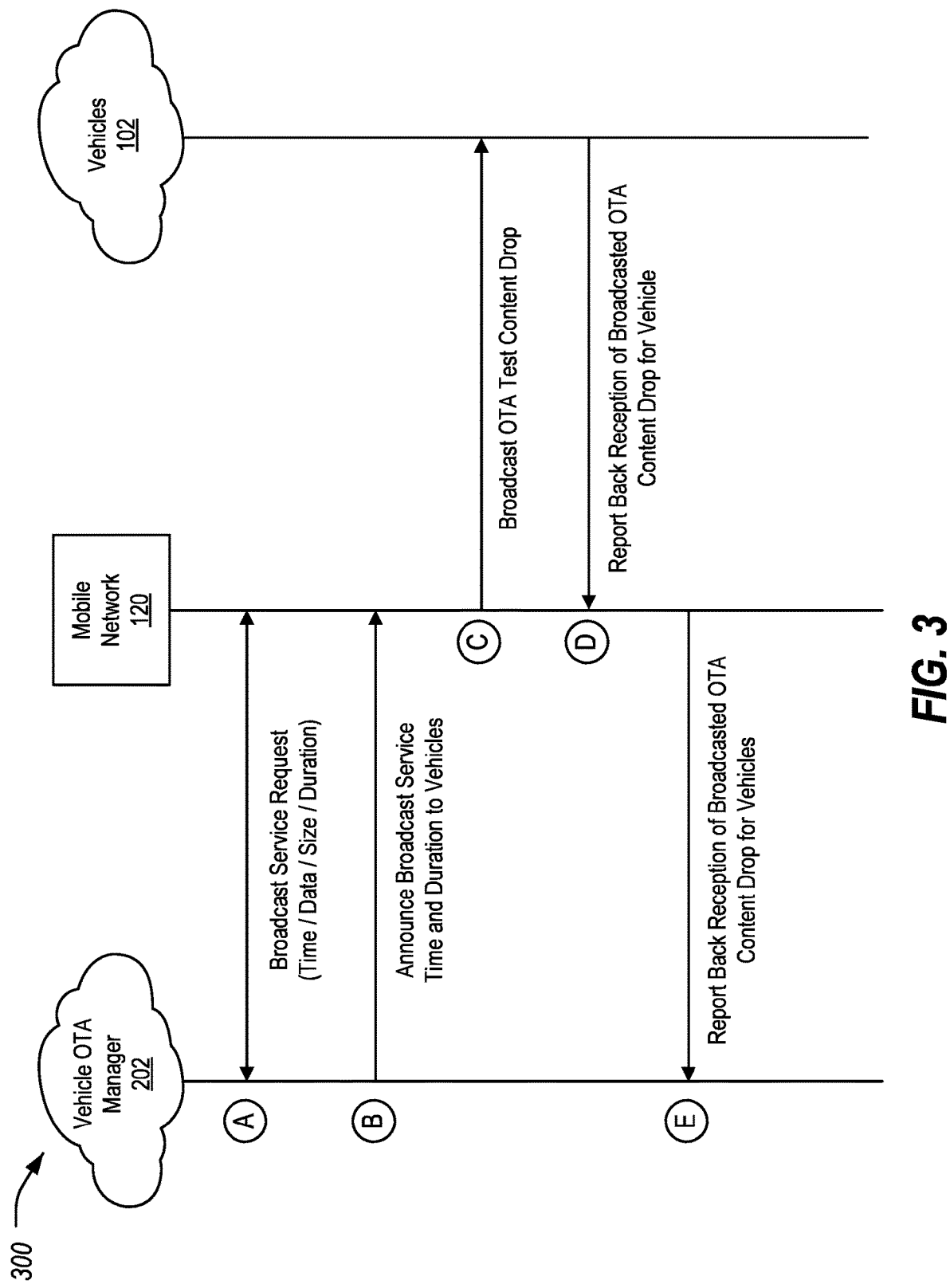
FIG. 3 illustrates an example data flow of operation of the OTA manager and mobile network in the serving of updates to the vehicles.

FIG. 3 illustrates an example data flow 300 of operation of the OTA manager 202 and mobile network 120 in the serving of updates to the vehicles 102. In an example, the data flow 300 may be performed using the OTA manager 202 and the elements of the system 100.

At index (A), the OTA manager 202 requests the MNO of the mobile network 120 to perform an OTA test. For instance, the test may specify one or more of: a content drop size (e.g., a small size such as 10 s or Kbs), a specific time (e.g., 2 AM on a Wednesday), a specific duration (e.g., a repeated broadcast for 30 mins), and/or a specific area (e.g., such as New York City downtown). The OTA manager 202 and the MNO may electronically negotiate these parameters and agree to perform the test.

At index (B), the OTA manager 202 send broadcast schedule information to each target vehicle 102 in the identified service area via a dedicated MNO connection. These requests may be done as unicast, for instance, not as broadcast.

At index (C), the MNO of the mobile network 120 broadcasts the small OTA test content according to the broadcast schedule information. For example, the content may be broadcast for the specified size, duration, and area, and during the scheduled time. At index (D), the vehicle 102 reports back to the mobile network 120 with respect to reception of the broadcast.

Once the content is fully broadcasted, it may be repeated for the scheduled duration. Thus, the operations at indexes (C) and (D) may be performed multiple times. Each of this repeat may be separately identifiable by the vehicle 102. For instance, in an example where the content is 10 Kb, the content may take approximately 2 minutes to broadcast at a predefined bitrate. In an example where the test duration is set to 30 minutes, the same 2 minutes of content may be repeated, resulting in 15 total repeats.

At index (E), the OTA manager 202 receives a reception report from the mobile network 120. For instance, the mobile network 120 may collect the individual reports from the vehicles 102 replying at index (D) and may compile the data into an overall reception report. This reception report may contains information such as: (i) what percentage of the content was received by the vehicles (e.g., 10%, 70%, 90%, 100%), (ii) how many total repeated broadcasts it took for a vehicle 102 to receive that percent of the content, (iii) what percentage of the content the vehicle 102 received for each repeat of the broadcast, and/or (iv) information indicative of the reception quality for the content at the vehicle 102 (e.g., signal strength, other radio parameters, etc.). This report may be sent by the mobile network 120 and received to the OTA manager 202 within a set time period from the performance of the test (e.g., within 48 hours of performing the broadcast).

Figure 4:
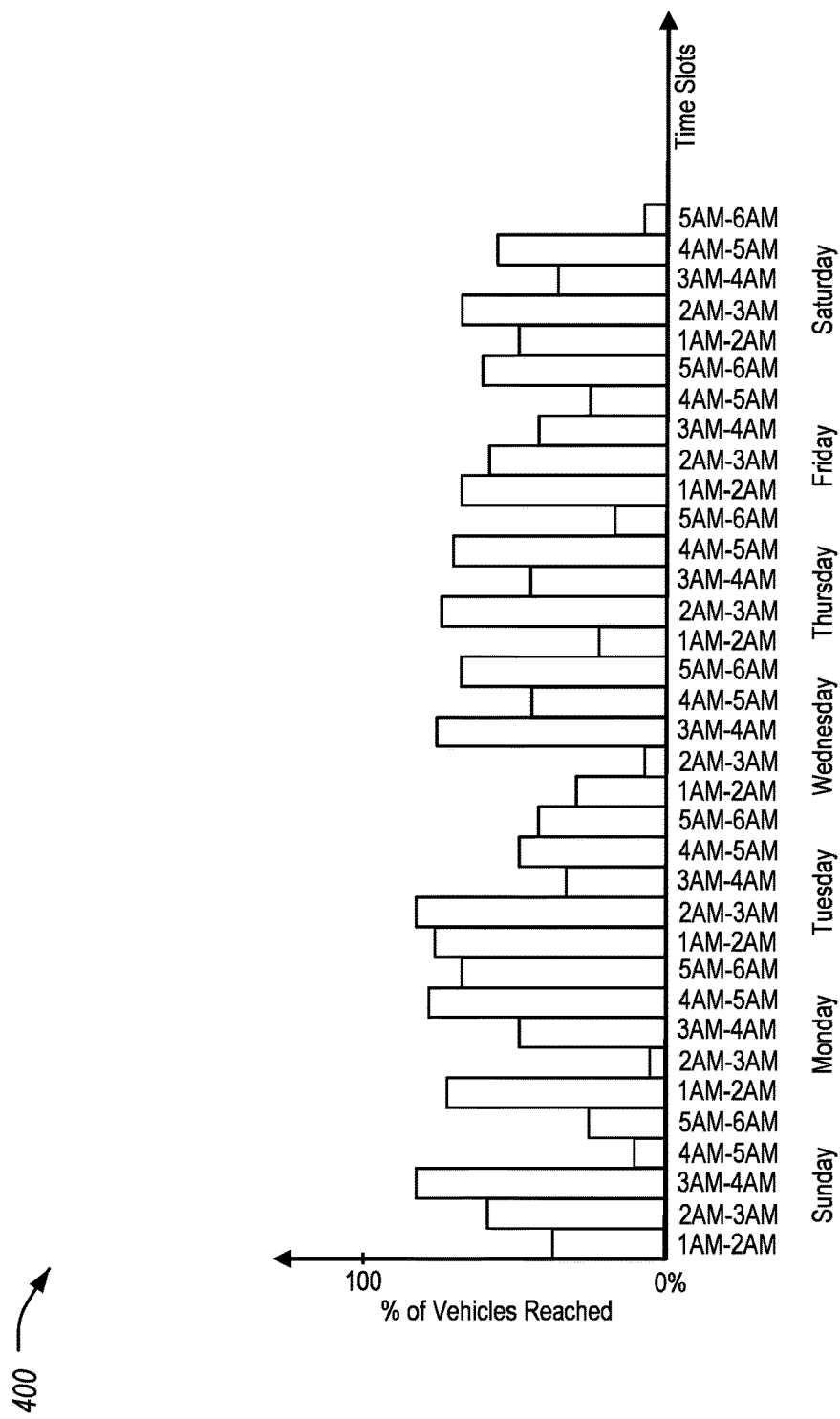
FIG. 4 illustrate an example graph of a statistical pattern of vehicle density and broadcast OTA reachability.

FIG. 4 illustrate an example graph 400 of a statistical pattern of vehicle density and broadcast OTA reachability. The operations of the data flow 300 may be repeated at times and days over a period (e.g., weeks, months, etc.). The results of these repeated tests may be used to formulate the data for the graph 400. As shown in the graph 400, the X-axis shows a plurality of time slots during which the testing was performed, while the Y-axis shows the percentage of vehicles 102 in the area that were reached during the indicated time slot.

Variations on the described approach to determining the pattern of vehicle density are possible. In an alternative to the approach illustrated in the data flow 300, the OTA manager 202 may obtain statistics from the mobile network 120 by requesting vehicle TCU 108 registration statistics from a mobility management entity (MME) of the MNO. This may provide the OTA manager 202 with general information of availability and distribution of intended vehicles 102, albeit without channel quality information. This may be achieved by the signaling between the OTA manager 202 and the mobile network 120, without requiring additional signaling to the vehicles 102 themselves. Thus, in this alternative approach, there is no transmission of OTA test content, which therefore avoids imposing an impact on MNO spectrum allocation comparing to the operations as shown in the data flow 300.

In another example variation, statistical data may be formed from network service report information descriptive of receive quality and number of repeat broadcasts that were performed by the mobile network 120 for the vehicles 102 to completely download a test file. This information may then be used to optimize (i) a duration for which an actual OTA update broadcast may be done, and/or (ii) whether a unicast follow-up is required to patch partial downloads (e.g., more than 50% or some other predefined limit of the vehicles 102 fail to receive the file).

Figure 5:
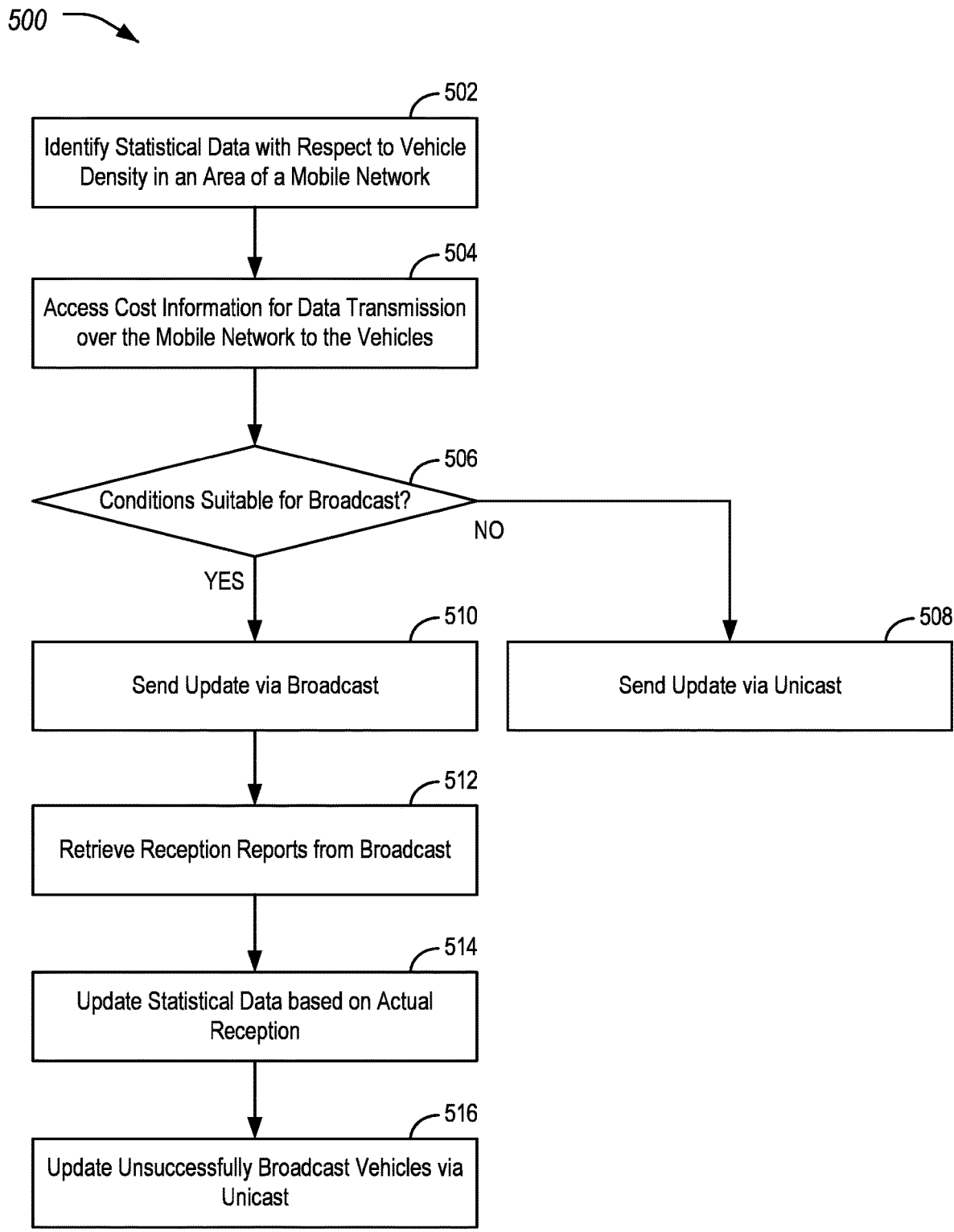
FIG. 5 illustrates an example process for OTA update of vehicles via broadcast and/or unicast transmission.

FIG. 5 illustrates an example process 500 for OTA update of vehicles 102 via broadcast and/or unicast transmission. In an example, the process 500 may be performed by the OTA manager 202 in communication with the other aspects of the system 100.

At operation 502, the OTA manager 202 identifies statistical data with respect to vehicle 102 density in an area of a mobile network 120. In an example, the OTA manager 202 may perform operations such as those discussed above with respect to the data flow 300 and/or the various mentioned variations. At operation 504, the OTA manager 202 accesses cost information from the MNO to identify a cost of sending data for each time slot per required broadcast channel bandwidth.

At operation 506, the OTA manager 202 determines, based on the statistical information and the cost information, what time slot(s) are best for an OTA broadcast in an area and if the MNO price during that time for broadcast is better or worse than the unicast cost. For instance, using the statistical data the OTA manager 202 may identify time slots during which there is availability and distribution of intended vehicles 102 of at least a predefined measure. The predefined measure may include, for instance, one or more of (i) a percentage of the content was received by the vehicles (e.g., 10%, 70%, 90%, 100%), (ii) how many total repeated broadcasts it took for a vehicle 102 to receive that percent of the content, (iii) what percentage of the content the vehicle 102 received for each repeat of the broadcast, and/or (iv) information indicative of the reception quality for the content at the vehicle 102 (e.g., signal strength, other radio parameters, etc.). The predefined measure may also include, for example, a minimum value of an overall percentage of vehicles 102 reached per time slot, as shown for example in the example graph 400. Moreover, the OTA manager 202 may utilize the cost information received at operation 504 to confirm that a cost for broadcast delivery is lower than a cost for unicast delivery (or the reverse). This may be done to ensure that the chosen approach is the more cost-effective choice. If update via unicast is identified, control passes to operation 508 to send the update. After operation 508, the process 500 ends.

If, however, update via broadcast is identified, control passes to operation 510 to send the update. Accordingly, at operation 510 the OTA manager 202 delivers the OTA update over broadcast instead of unicast responsive to at least a predefined minimum target of vehicles 102 being located in the geographical area. Continuing to operation 512, the OTA manager 202 retrieves reception reports from the MNO with respect to the broadcast performed at operation 510.

At operation 514, these reception reports from actual OTA update broadcasts may be matched to the statistical data identified at operation 502. This may be done to validate whether the test OTA broadcast statistics of operation 502 are representative of the actual OTA. In some examples, the actual OTA broadcast information may be used to update the statistics. This may accordingly allow for future determinations of whether to use unicast or broadcast to be informed by actual data.

At operation 516, the OTA manager 202 updates any vehicles 102 that did not receive the update via broadcast. Accordingly, any remaining vehicle 102 may also receive the update, despite the broadcast not being competed successfully. After operation 516, the process 500 ends.

Figure 6:
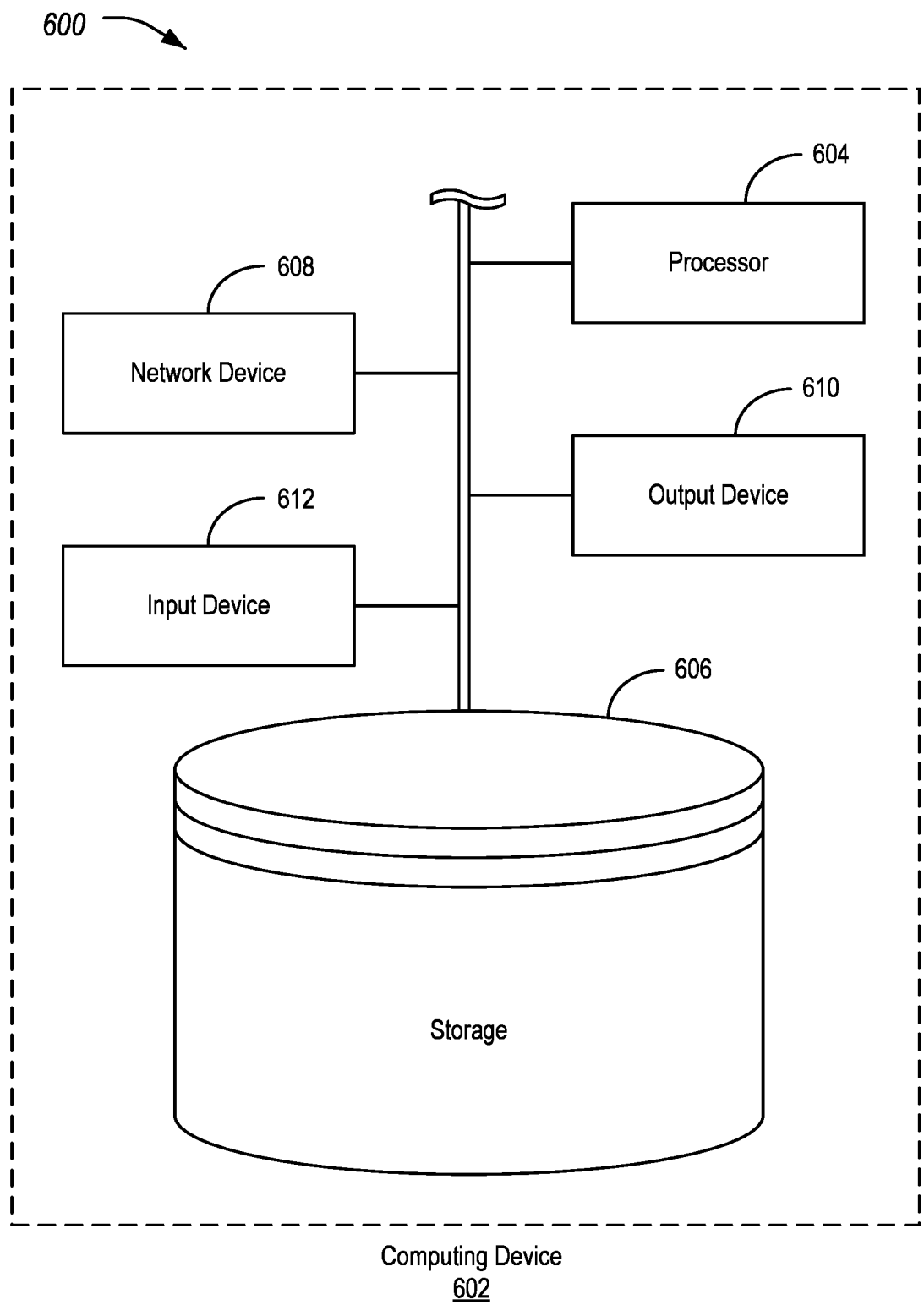
FIG. 6 illustrates an example of a computing device for use in OTA update of vehicles via broadcast and/or unicast transmission.

FIG. 6 illustrates an example 600 of a computing device 602 for use in OTA update of vehicles 102 via broadcast and/or unicast transmission. Referring to FIG. 6, and with reference to FIGS. 1-5, the vehicles 102 and the cloud server 124 may be examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices described herein that send and/or receive data from external devices over networks. Examples of suitable network devices 608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for performing over-the-air (OTA) update of vehicles via broadcast and/or unicast transmission, comprising:
    an OTA manager device, programmed to
        identify statistical data with respect to vehicle density in a geographical area of a mobile network, the statistical data being computed from reception reports received from vehicles responsive to an OTA test content drop of predefined time, data, size, and duration as performed by the mobile network;
        responsive to at least a predefined minimum target of vehicles being located in the geographical area, determine, based on the statistical data, one or more time slots for an OTA delivery in the geographic area suitable for broadcast delivery; and
        deliver the OTA update over broadcast instead of unicast during the one or more time slots.

2. The system of claim 1, wherein the OTA manager device is further programmed to:
    receive cost information from the mobile network with respect to pricing for performing OTA update over broadcast instead of unicast during the one or more time slots; and
    deliver the OTA update over broadcast instead of unicast upon the further condition that a cost for broadcast delivery is lower than a cost for unicast delivery.

3. The system of claim 1, where the OTA manager device is further programmed to:
    receive actual delivery reception reports from the mobile network indicative of actual delivery of the OTA update; and
    update the statistical data based on the actual delivery reception reports.

4. The system of claim 1, wherein the reception reports include information descriptive of receive quality and number of repeat broadcasts that were performed by the mobile network for the vehicles to completely download a test file for the test content drop.

5. The system of claim 4, wherein the test file is provided to the vehicles a plurality of times during the predefined time of the OTA test content drop.

6. The system of claim 1, wherein the OTA manager device is further programmed to compile the reception reports into the statistical data.

7. The system of claim 1, wherein the geographical area is a service area of a cellular tower of the mobile network.

8. A method for performing over-the-air (OTA) update of vehicles via broadcast and/or unicast transmission, comprising:
    directing a geographical area of a mobile network to perform OTA test content drop of predefined time, data, size, and duration;
    identifying statistical data with respect to vehicle density in the geographical area, the statistical data being computed from reception reports received from vehicles responsive to the OTA test content drop;
    responsive to at least a predefined minimum target of vehicles being located in the geographical area, determining, based on the statistical data, one or more time slots for an OTA delivery in the geographic area suitable for broadcast delivery; and delivering the OTA update over broadcast instead of unicast during the one or more time slots.

9. The method of claim 8, further comprising:
receiving cost information from the mobile network with respect to pricing for performing OTA update over broadcast instead of unicast during the one or more time slots; and
delivering the OTA update over broadcast instead of unicast upon the further condition that a cost for broadcast delivery is lower than a cost for unicast delivery.

10. The method of claim 8, further comprising:
receiving actual delivery reception reports from the mobile network indicative of actual delivery of the OTA update; and
updating the statistical data based on the actual delivery reception reports.

11. The method of claim 8, wherein the reception reports include information descriptive of receive quality and number of repeat broadcasts that were performed by the mobile network for the vehicles to completely download a test file for the test content drop.

12. The method of claim 11, wherein the test file is provided to the vehicles a plurality of times during the predefined time of the OTA test content drop.

13. The method of claim 8, wherein the geographical area is a service area of a cellular tower of the mobile network.

14. A non-transitory computer-readable medium comprising instructions for performing over-the-air (OTA) update of vehicles via broadcast and/or unicast transmission, that, when executed by a processor of an OTA manager device, cause the OTA manager device to:
direct a geographical area of a mobile network to perform OTA test content drop of predefined time, data, size, and duration;
identify statistical data with respect to vehicle density in the geographical area, the statistical data being computed from reception reports received from vehicles responsive to the OTA test content drop;
responsive to at least a predefined minimum target of vehicles being located in the geographical area, determine, based on the statistical data, one or more time slots for an OTA delivery in the geographic area suitable for broadcast delivery; and
deliver the OTA update over broadcast instead of unicast during the one or more time slots.

15. The medium of claim 14, further comprising instructions that, when executed by the processor of the OTA manager device, cause the OTA manager device to:
receive cost information from the mobile network with respect to pricing for performing OTA update over broadcast instead of unicast during the one or more time slots; and
deliver the OTA update over broadcast instead of unicast upon the further condition that a cost for broadcast delivery is lower than a cost for unicast delivery.

16. The medium of claim 14, further comprising instructions that, when executed by the processor of the OTA manager device, cause the OTA manager device to:
receive actual delivery reception reports from the mobile network indicative of actual delivery of the OTA update; and
update the statistical data based on the actual delivery reception reports.

17. The medium of claim 14, wherein the reception reports include information descriptive of receive quality and number of repeat broadcasts that were performed by the mobile network for the vehicles to completely download a test file for the test content drop.

18. The medium of claim 17, wherein the test file is provided to the vehicles a plurality of times during the predefined time of the OTA test content drop.

19. The medium of claim 14, wherein the geographical area is a service area of a cellular tower of the mobile network.

* * * * *